(12) United States Patent
Park et al.

(10) Patent No.: US 8,605,748 B2
(45) Date of Patent: *Dec. 10, 2013

(54) COMMUNICATION METHOD

(75) Inventors: Jisoo Park, Daejeon (KR); Sook Jin Lee, Daejeon (KR); Namsuk Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 281 days.

This patent is subject to a terminal disclaimer.

(21) Appl. No.: 12/963,075

(22) Filed: Dec. 8, 2010

(65) Prior Publication Data

US 2011/0134813 A1    Jun. 9, 2011

(30) Foreign Application Priority Data

Dec. 8, 2009  (KR) .................. 10-2009-0121381
Dec. 8, 2010  (KR) .................. 10-2010-0124652

(51) Int. Cl.
  *H04J 3/16*  (2006.01)
  *H04B 1/00*  (2006.01)

(52) U.S. Cl.
  USPC .................. 370/470; 370/508; 455/69

(58) Field of Classification Search
  USPC .......... 714/746–749, 48, 52; 370/328, 329, 370/337, 347, 321, 431, 468, 470, 394, 471, 370/472, 473, 276, 279–281, 295
  See application file for complete search history.

(56) References Cited

U.S. PATENT DOCUMENTS

| | | | |
|---|---|---|---|
| 8,116,262 B2 * | 2/2012 | Zhang et al. .................. 370/328 |
| 2009/0181689 A1 | 7/2009 | Lee et al. | |
| 2009/0276676 A1 | 11/2009 | Lee et al. | |
| 2010/0074211 A1 | 3/2010 | Kim et al. | |
| 2010/0199140 A1 | 8/2010 | Lee et al. | |
| 2010/0211845 A1 | 8/2010 | Lee et al. | |
| 2011/0044261 A1 * | 2/2011 | Cai et al. .................. 370/329 |
| 2011/0096768 A1 * | 4/2011 | Park et al. .................. 370/350 |
| 2011/0107170 A1 * | 5/2011 | Park et al. .................. 714/749 |
| 2011/0164515 A1 * | 7/2011 | Park et al. .................. 370/252 |

FOREIGN PATENT DOCUMENTS

| | | |
|---|---|---|
| KR | 10-2008-0030941 | 4/2008 |
| KR | 10-2009-0005467 | 1/2009 |

(Continued)

OTHER PUBLICATIONS

Office Action mailed Jan. 24, 2013 in corresponding U.S. Appl. No. 12/914,453.
Office Action mailed Jun. 5, 2013 in corresponding U.S. Appl. No. 12/914,453.

(Continued)

*Primary Examiner* — Hanh N Nguyen
(74) *Attorney, Agent, or Firm* — Staas & Halsey LLP

(57) ABSTRACT

Disclosed are a base station and a mobile station which communicate with each other using a frame comprising one or more downlink subframes and one or more uplink subframes. The base station transmits a data burst in a subframe corresponding to a downlink subframe index of a frame corresponding to a first frame index. The mobile station transmits a feedback for the data burst in a subframe corresponding to an uplink subframe index of a frame corresponding to a second frame index. The second frame index and the uplink subframe index are determined by a parameter value. The parameter value is determined by a difference between radio signal processing time and the number of the one or more uplink subframes.

20 Claims, 11 Drawing Sheets

(56) References Cited

FOREIGN PATENT DOCUMENTS

| KR | 10-2009-0078723 | 7/2009 |
|---|---|---|
| KR | 10-2009-0078724 | 7/2009 |
| KR | 10-2009-0078727 | 7/2009 |
| KR | 10-2009-0078731 | 7/2009 |
| KR | 10-2009-0114802 | 11/2009 |

OTHER PUBLICATIONS

U.S. Appl. No. 12/914,453, filed Oct. 28, 2010, Jisoo Park, Electronics and Telecommunications Research Institute.
US 7,760,687, 07/2010, Kim et al. (withdrawn)

* cited by examiner

COMMUNICATION METHOD

CROSS-REFERENCE TO RELATED APPLICATION

This application claims priority to and the benefit of Korean Patent Application No. 10-2009-0121381 and No. 10-2010-0124652 filed in the Korean Intellectual Property Office on Dec. 8, 2009 and Dec. 8, 2010, the entire contents of which are incorporated herein by reference.

BACKGROUND OF THE INVENTION (a) Field of the Invention

The present invention relates to a communication method. More particularly, the present invention relates to a transmission timing of a packet or message.

(b) Description of the Related Art

A duplex communication scheme used in a wireless mobile communication system may be classified into a Frequency Division Duplexing (FDD) transmission mode scheme for uplink (UL) and downlink (DL) bidirectional communication which distinguishes uplink and downlink transmission and reception resources based on frequency and a Time Division Duplexing (TDD) transmission mode scheme for uplink and downlink bidirectional communication which distinguishes uplink and downlink transmission and reception resources based on time.

A wireless mobile communication system generally employs a communication frame to perform communication.

Next, a communication frame will be described with reference to FIGS. 1 and 2.

FIG. 1 illustrates a communication frame of a Frequency Division Duplex (FDD) scheme in the conventional art.

As illustrated in FIG. 1, a communication frame of a Frequency Division Duplex scheme frequency scheme comprises F downlink subframes and F uplink subframes. F corresponds to the number of subframes.

Downlink subframe indices 0 to F−1 are assigned to the F downlink subframes, and uplink subframe indices 0 to F−1 are assigned to the F uplink subframes.

FIG. 2 illustrates a communication frame of a Time Division Duplex (TDD) scheme in the conventional art.

As illustrated in FIG. 2, a communication frame of a Time Division Duplex scheme frequency scheme comprises D downlink subframes and U uplink subframes.

Downlink subframe indices 0 to D−1 are assigned to the D downlink subframes, and uplink subframe indices 0 to U−1 are assigned to the U uplink subframes.

To achieve high speed data packet transmission, low delay, and transmission reliability, mobile communication systems are making use of a Hybrid Automatic Repeat Request (HARQ) scheme which incorporates a Forward Error Correction (FEC) scheme and an Automatic Repeat Request (ARQ) scheme.

In the ARQ scheme, an error is corrected through data packet retransmission, for which a stop and wait (SAW) scheme, a go-back-N (GBN) scheme, a selective repeat (SR) scheme, and the like, are used. The SAW scheme is a scheme in which whether or not a transmitted frame has been properly received is first checked and a next frame is then transmitted.

According to the HARQ scheme, a receiver checks whether an error occurs by decoding a data packet received by a physical. If no error occurs, the receiver transmits an acknowledgement (ACK) signal as a response signal to inform a transmitter about the successful reception of the data packet. If an error is detected from the received data packet, the receiver transmits a negative-acknowledgement (NACK) signal as a response signal to inform the transmitter about the error detection. Upon receiving the NACK signal, the transmitter may retransmit data.

The retransmission scheme of the HARQ may be classified into a synchronous HARQ scheme and an asynchronous HARQ scheme depending on the transmission timing of a retransmission packet. In the synchronous HARQ scheme, the transmission timing of a retransmission packet for an initial transmission packet is kept constant. In the asynchronous HARQ scheme, a scheduler of a base station determines the transmission timing of a retransmission packet for an initial transmission packet.

The HARQ may be classified into an adaptive HARQ and a non-adaptive HARQ according to whether the amount and positions of allocated resources are varied. The adaptive HARQ is a scheme in which the amount and positions of allocated resources are varied. The non-adaptive HARQ is a scheme in which the amount and positions of allocated resources are fixed.

By properly combining the synchronous and asynchronous HARQ schemes and the adaptive and non-adaptive HARQ schemes together, and employing low signaling overhead, a high scheduling gain and a high-speed data transmission effect are achieved. For example, a mobile communication system may adopt an adaptive asynchronous HARQ for downlink data transmission and the synchronous HARQ for uplink data transmission.

To reduce signaling overhead caused by a control signal, such as resource allocation information, it may be effective to use a synchronous, non-adaptive HARQ scheme in which a retransmission timing and the amount and positions of allocated resources are not varied. But, it is rather effective to use an asynchronous, adaptive HARQ scheme with a scheduling gain without consideration for signaling overhead.

By properly combining the synchronous and asynchronous HARQ schemes and the adaptive and non-adaptive HARQ schemes together, and employing low signaling overhead, a high scheduling gain and a high-speed data transmission effect are achieved.

If a terminal uses the synchronous HARQ scheme for downlink, the terminal needs to be allocated resources from a base station through a downlink control signal in order to transmit a HARQ packet on an uplink. That is, uplink transmission resources are allocated through a downlink control signal, and a HARQ packet is transmitted in a designated position (slot or subframe). Moreover, if the HARQ packet is successfully received without an error, the base station transmits an ACK as an HARQ feedback signal. On the contrary, if the reception fails, the base station transmits an NACK. Upon receiving the NACK as the HARQ feedback signal, the terminal retransmits the previously transmitted packet.

Particularly, in a TDD transmission mode which distinguishes uplink and downlink transmission and reception methods, a gain can be obtained more efficiently by taking into account efficient timings of time division transmission and resource allocation using the ratio of uplink and downlink frequencies and the ratio of uplink and downlink transmission channels.

In the TDD transmission mode, one frame may consist of one or more subframes for DL and UL. The ratio of subframes allocated for DL and UL may be varied according to the pattern of a frame structure. If the number of subframes constituting one frame is 6, 7, or 8, one of various frames structures, including 3:3, 4:2, 2:4, 5:2, 3:4, 4:3, 2:5, 6:2, 5:3, 4:4, 3:5, 2:6, . . . may be selected.

A wireless mobile communication system may use a Transmission Time Interval TTI as a transmission time unit. TTI is the duration of the transmission of the physical layer encoded packet over the radio air interface, and is equal to an integer number of Advanced Air Interface (AAI) subframes. That is, 1 TTI is the duration of transmission of a packet (subpacket or data burst) occupying a length of 1 subframe, and n TTI is the duration of transmission of a packet occupying a length of n subframes.

Moreover, a data burst may be transmitted over one subframe, or may be transmitted over a plurality of consecutive subframes. For transmission of a data burst in one frame, the duration of the data burst is referred to as one TTI or a default TTI, whereas, for transmission of a data burst over a plurality of consecutive subframes, the duration of the corresponding data burst is a Long TTI. For example, for Long TTI transmission in the FDD transmission mode, a data burst may be defined to occupy a length of four subframes, whereas, for Long TTI transmission in the TDD mode, a data burst may be defined to occupy the entire DL or UL subframes in one frame for DL or UL.

In some systems, the length of subframes occupied by the data burst that are transmitted in accordance with a required packet size may be differently determined as 1 TTI, 2 TTI, 3 TTI, . . . depending on the characteristics of the data.

According to the conventional synchronous HARQ method, the transmission of a control signal for resource allocation, an HARQ packet, and a corresponding HARQ feedback signal are adapted to occur at a predefined timing. Particularly, for uplink UL, an HARQ packet is retransmitted in the same subframe position as the preceding subframe in which the data burst has been transmitted.

According to the conventional synchronous HARQ method, in the TDD mode, an HARQ transmission and reception procedure of DL and UL data bursts allocated to a subframe adjacent to DL and UL switching points may bring about the following problems.

That is, no consideration is being given for variations of an HARQ reference timing with data burst processing time and control signal processing time that may be varied or fixed in accordance with the packet processing capability of a base station and a plurality of terminals. Moreover, processing capability and processing time are not flexible since transmission occupation time for data bursts of various lengths is not taken into account. In addition, one way access delay for DL and UL may occur because packet transmission and feedback signal transmission may be delayed or slow. For this reason, high-speed packet transmission is not possible, and the delay of the HARQ procedure may lengthen the buffer's waiting time in operation and make an HARQ timing procedure complicated.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a flexible HARQ timing procedure which takes radio signal processing time, frame structure, and data burst transmission occupation time into consideration.

According to an aspect of the present invention, there is provided a method for a mobile station to communicate with a base station using a frame comprising one or more downlink subframes and one or more uplink subframes, the method including: receiving a data burst from the base station in a frame corresponding to a first frame index; determining a first parameter value using a difference between a radio signal processing time and the number of the one or more uplink subframes; determining a frame offset using the first parameter value; and transmitting a feedback for the data burst to the base station in a frame corresponding to a second frame index determined by the first frame index and the frame offset.

The determining of the frame offset includes determining the frame offset based on a difference between the number of the one or more downlink subframes and the first parameter value.

The receiving of the data burst includes receiving the data burst in a subframe corresponding to a downlink subframe index of the frame corresponding to the first frame index, and the transmitting of the feedback includes: determining an uplink subframe index using the downlink subframe index and the first parameter value; and transmitting the feedback in a subframe corresponding to the uplink subframe index of a frame corresponding to the second frame index.

The determining of the uplink subframe index includes determining the uplink subframe index as 0 if the downlink subframe index is greater than or equal to a value obtained by subtracting the first parameter value from the number of the one or more downlink subframes.

The determining of the uplink subframe index includes: determining a second parameter value using a difference between the number of the one or more downlink subframes and a radio signal processing time; and determining the uplink subframe index using the downlink subframe index, the first parameter value, the second parameter value, and the number of subframes occupied by the data burst.

If the first parameter value is less than or equal to 0, the uplink subframe index is determined by the following Equation:

$$n = \begin{cases} 0, & \text{for } 0 \le m + (N_{TTI} - 1) < X \\ m + (N_{TTI} - 1) - X, & \text{for } X \le m + (N_{TTI} - 1) < D \end{cases}$$

where n is the uplink subframe index, m is the downlink subframe index, $N_{TTI}$ is the number of subframes occupied by the data burst, X is the second parameter value, and D is the number of the one or more downlink subframes.

$$n = \begin{cases} 0, & \text{for } 0 \le m + (N_{TTI} - 1) < X \\ m + (N_{TTI} - 1) - X, & \text{for } X \le m + (N_{TTI} - 1) < D \end{cases}$$

If the first parameter value is greater than 0, the uplink subframe index is determined by the following Equation:

$$n = \begin{cases} 0, & \text{for } 0 \le m + (N_{TTI} - 1) < X \\ m + (N_{TTI} - 1) - X, & \text{for } X \le m + (N_{TTI} - 1) < D - K' \\ 0, & \text{for } D - K' \le m + (N_{TTI} - 1) < D \end{cases}$$

where K' is the first parameter value.

$$n = \begin{cases} 0, & \text{for } 0 \le m + (N_{TTI} - 1) < X \\ m + (N_{TTI} - 1) - X, & \text{for } X \le m + (N_{TTI} - 1) < D - K' \\ 0, & \text{for } D - K' \le m + (N_{TTI} - 1) < D \end{cases}$$

According to an aspect of the present invention, there is provided a method for a base station to communicate with a mobile station using a frame comprising one or more downlink subframes and one or more uplink subframes, the method including: transmitting a data burst to the mobile station in a frame corresponding to a first frame index; and receiving a feedback for the data burst from the mobile station in a frame corresponding to a second frame index, wherein the second frame index is determined by the first frame index and a frame offset, and the frame offset is determined by a parameter value determined by a difference between radio signal processing time and the number of the one or more uplink subframes.

The frame offset is determined based on a difference between the number of the one or more downlink subframes and the parameter value.

The data burst is transmitted in a subframe corresponding to a downlink subframe index, the feedback is received in a subframe corresponding to an uplink subframe index, and, if the downlink subframe index is greater than or equal to a value obtained by subtracting the parameter value from the number of the one or more downlink subframes, the uplink subframe index is determined as 0.

According to an aspect of the present invention, there is provided a method for a mobile station to communicate with a base station using a frame comprising one or more downlink subframes and one or more uplink subframes, the method including: receiving resource allocation information from the base station in a frame corresponding to a first frame index; determining a first parameter value using a difference between a radio signal processing time and the number of the one or more uplink subframes; determining a first frame offset by the first parameter value; and transmitting a data burst to the base station in a frame corresponding to a second frame index determined by the first frame index and the frame offset.

The method further includes receiving a feedback for the data burst in a frame corresponding to a third frame index, wherein the third frame index is determined by the second frame index and a second frame offset, and the second frame offset is determined by the first parameter value.

The method includes: if the feedback is negative, determining a third frame offset by the first parameter value; and retransmitting the data burst to the base station in a frame corresponding to a fourth frame index determined by the third frame index and the third frame offset.

The second frame offset is determined by comparing a difference between the number of the one or more downlink subframes and the first parameter value with the second frame index, and the third frame offset is determined by comparing the difference between the number of the one or more downlink subframes and the first parameter value with the second frame index.

The resource allocation information is received in a frame corresponding to a first downlink subframe index, the data burst is transmitted in a subframe corresponding to a first uplink subframe index, and the first uplink subframe index is determined by the first parameter value.

The first uplink subframe index is determined by the number of subframes occupied by the data burst, the comparison between the number of the one or more downlink subframes and the one or more uplink subframes, the first parameter value, and a second parameter value determined by a difference between the number of the one or more downlink subframes and the radio signal processing time.

The feedback is received in a subframe corresponding to a second downlink subframe index, the data burst is retransmitted in a subframe corresponding to a second uplink subframe index, and the second downlink subframe index is determined by the number of subframes occupied by the data burst and the first parameter value, wherein the second uplink subframe index is the same as the first uplink subframe index.

According to an aspect of the present invention, there is provided a method for a base station to communicate with a mobile station using a frame comprising one or more downlink subframes and one or more uplink subframes, the method including: transmitting resource allocation information to the mobile station in a frame corresponding to a first frame index; and receiving a data burst from the mobile station in a frame corresponding to a second frame, wherein the second frame index is determined by the first frame index and a frame offset, and the frame offset is determined by a parameter value determined by a difference between a radio signal processing time and the number of the one or more uplink subframes.

The method further includes: transmitting a feedback for the data burst in a frame corresponding to a third frame index; and retransmitting the data burst to the base station in a frame corresponding to a fourth frame index, wherein the third frame index is determined by the first parameter value, and the fourth frame index is determined by the first parameter value.

The resource allocation information is transmitted in a subframe corresponding to a first downlink subframe index, the data burst is received in a subframe corresponding to a first uplink subframe index, and the first uplink subframe index is determined by the first downlink subframe index and the first parameter value.

According to a feature of the present invention, high-speed packet transmission is made possible by preventing packet transmission delay. Moreover, a sequential HARQ timing procedure is provided for each channel, and a flexible HARQ timing procedure is provided which takes the radio signal processing time of base station/mobile station, the structure of a frame, and the transmission occupation time of a data burst into consideration.

DETAILED DESCRIPTION OF THE EMBODIMENTS

Figure 1:
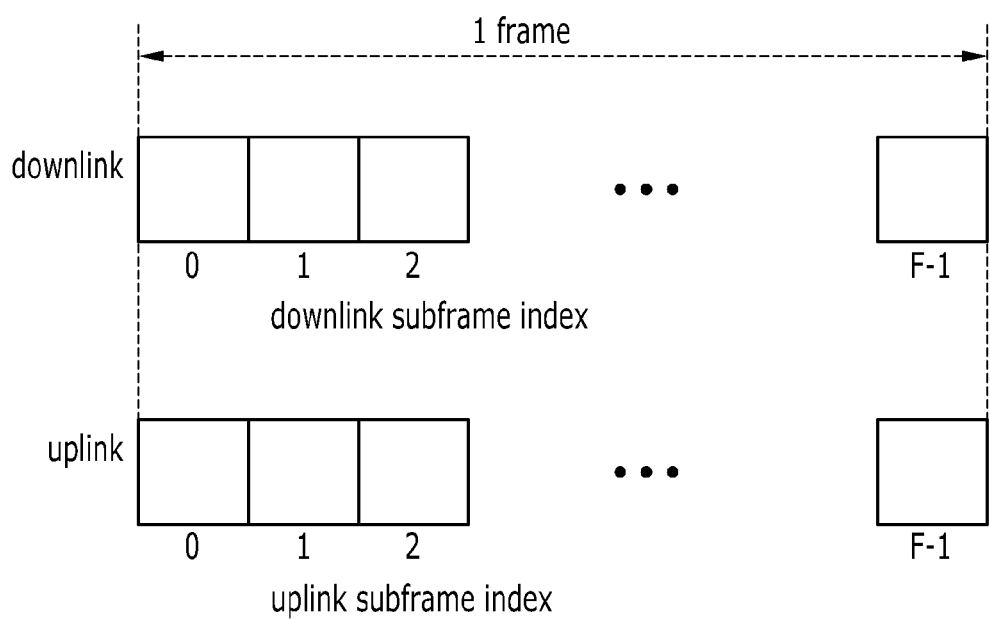
FIG. 1 illustrates a communication frame of a Frequency Division Duplex (FDD) scheme in the conventional art.
Figure 2:
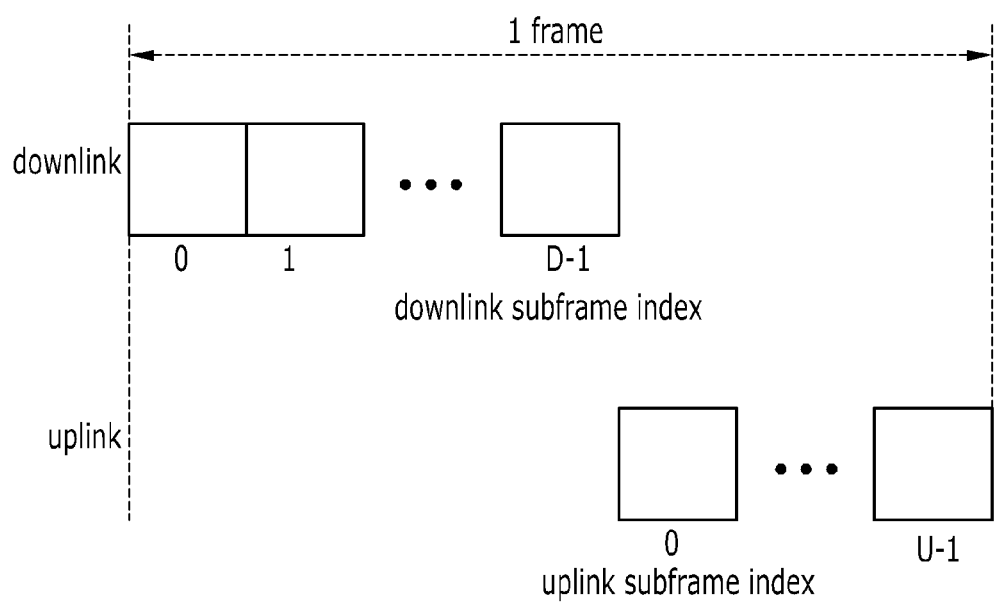
FIG. 2 illustrates a communication frame of a Time Division Duplex (TDD) scheme in the conventional art.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements.

In this specification, a mobile station (MS) may designate a terminal, a mobile terminal (MT), a subscriber station (SS), a portable subscriber station (PSS), user equipment (UE), an access terminal (AT), etc., and may include the entire or partial functions of the mobile terminal, the subscriber station, the portable subscriber station, the user equipment, etc.

In this specification, a base station (BS) may designate an access point (AP), a radio access station (RAS), a Node B, a base transceiver station (BTS), a mobile multihop relay (MMR)-BS, etc., and may include the entire or partial functions of the access point, the radio access station, the node B, the base transceiver station, the MMR-BS, etc.

Next, referring to FIG. 3, a downlink data communication method will be described according to an exemplary embodiment of the present invention.

Figure 3:
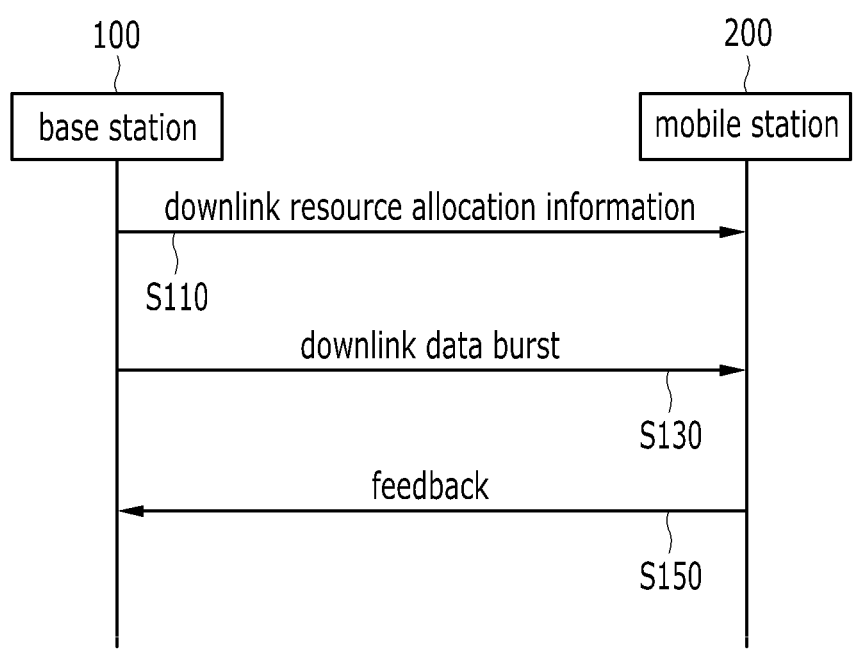
FIG. 3 is a flowchart illustrating a downlink data communication method according to an exemplary embodiment of the present invention.

FIG. 3 is a flowchart illustrating a downlink data communication method according to an exemplary embodiment of the present invention.

First of all, a base station 100 transmits downlink resource allocation information to a mobile station 200 in an l-th subframe of an i-th frame (S110). The downlink resource allocation information may be a control signal, such as A-MAP (Advanced MAP).

Next, the base station 100 starts the transmission of a downlink data burst, such as a subpacket, through a downlink resource allocated according to downlink resource allocation information in an m-th subframe of the i-th frame (S130).

The mobile station 200 decodes the received downlink data burst, and transmits an ACK feedback as a positive response to the base station 100 if the decoding is successful, and the mobile station 200 transmits an NACK feedback as a negative response to the base station 100 if the decoding fails (S150). The mobile station 200 uses an n-th subframe of a j-th frame for feedback transmission.

In an exemplary embodiment of the present invention, if one superframe comprises four frames, the frame indices may range from 0 to 3.

According to an exemplary embodiment of the present invention, the frame indices i and j and the subframe indices l, m, and n may be determined for TDD as in Table 1.

Table 1 shows TDD DL HARQ timing according to an exemplary embodiment of the present invention.

TABLE 1

| category | subframe index | frame index |
| --- | --- | --- |
| DL resource allocation control signal information transmission subframe | l | i |
| HARQ packet transmission subframe | m = l | i |
| HARQ feedback signal transmission subframe | For D > U, $n = \begin{cases} 0, & \text{for } 0 \leq m < K \\ m - K, & \text{for } K \leq m < U + K \\ U - 1, & \text{for } U + K \leq m < D \end{cases}$ <br> For D ≤ U, n = m − K | j = (i + z) mod 4 |

In Table 1, 'A mod B' is the remainder of division of 'A' by 'B'.

The parameter K is a parameter determined depending on system capability, such as channel bandwidth, the number of subframes, etc., in the time division duplex scheme, and is used to obtain an HARQ reference timing interval. A downlink HARQ reference timing interval refers to an interval between a downlink subframe for downlink data burst transmission and a downlink subframe for HARQ feedback transmission. An uplink HARQ reference timing interval refers to an interval between a downlink subframe for transmission of uplink resource allocation information and an uplink subframe for transmission of an uplink data burst.

Parameter K may be determined according to Equation 1 or 2.

$$K = \begin{cases} \text{floor}((D - U)/2), & \text{for } D > U \\ -\text{ceil}((U - D)/2), & \text{for } D \leq U \end{cases} \quad \text{(Equation 1)}$$

$$K = \begin{cases} \text{floor}((D - U)/2), & \text{for } D \geq U \\ -\text{ceil}((U - D)/2), & \text{for } D < U \end{cases} \quad \text{(Equation 2)}$$

Ceil(x) is a function returning the smallest integer value greater than or equal to parameter x, and floor(x) is a function returning the greatest interval value less than or equal to parameter x. Since K=0 for D=U, Equation 1 is equivalent to Equation 2.

In Table 1, downlink feedback frame offset z in TDD transmission mode may be determined according to Equation 3.

$$z = \begin{cases} 0, & \text{if } ((D - m - N_{TTI} + n) \geq T_{proc} \\ 1, & \text{else} \end{cases} \quad \text{(Equation 3)}$$

In Equation 3, $N_{TTI}$, is the value of a TTI, which is unit of transmission time, and represents the number of subframes occupied for data burst transmission, i.e., the number of subframes which an HARQ packet spans. $N_{TTI}=1$ for One TTI transmission, and $N_{TTI}=D$ for Long TTI transmission. $T_{proc}$ represents radio signal processing time, i.e., data burst processing time.

Next, an uplink data communication method according to an exemplary embodiment of the present invention will be described with reference to FIG. 4.

Figure 4:
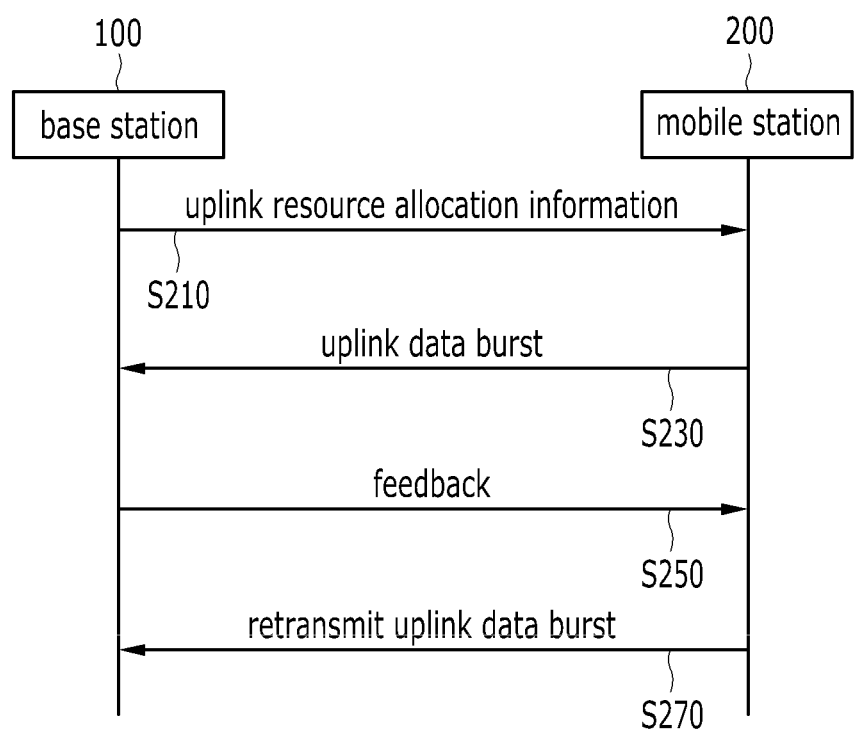
FIG. 4 is a flowchart illustrating an uplink data communication method according to an exemplary embodiment of the present invention.

FIG. 4 is a flowchart illustrating an uplink data communication method according to an exemplary embodiment of the present invention.

First of all, a base station 100 transmits uplink resource allocation information to a mobile station 200 in an l-th subframe of an i-th frame (S210). The uplink resource allocation information may be a control signal, such as A-MAP (Advanced MAP).

Next, the mobile station 200 starts the transmission of an uplink data burst, such as a subpacket, through an uplink resource allocated according to uplink resource allocation information in an m-th subframe of the j-th frame (S230).

The base station 100 transmits a feedback for the received uplink data burst to the mobile station 200 in an l-th subframe of a k-th frame (S250). The base station 100 decodes the received uplink data burst, and transmits an ACK feedback as a positive response to the mobile station 200 if the decoding is successful, and transmits an NACK feedback as a negative response to the mobile station 200 if the decoding fails.

If the feedback is a negative response, the mobile station 200 retransmits the uplink data burst in an m-th subframe of a p-th frame (S270).

According to an exemplary embodiment of the present invention, the frame indices 1, j, k, and p and the subframe indices l and m may be determined for TDD as in Table 2.

Table 2 shows TDD UL HARQ timing according to an exemplary embodiment of the present invention.

TABLE 2

| category | Subframe index | Frame index |
| --- | --- | --- |
| UL resource allocation control signal transmission subframe | l | i |
| HARQ packet transmission subframe | For $D \geq U$,  $m = \begin{cases} 0, & \text{for } 0 \leq l < K \\ l - K, & \text{for } K \leq l < U + K \\ U - 1, & \text{for } U + K \leq l < D \end{cases}$  For $1 < D < U$,  $m = \begin{cases} 0, \ldots, \text{or } l - K, & \text{for } l = 0 \\ l - K, & \text{for } 0 < l < D - 1 \\ l - K, \ldots, \text{or } U - 1, & \text{for } l = D - 1 \end{cases}$ | $j = (i + v) \bmod 4$ |
| HARQ feedback signal transmission subframe | l | $k = (j + 1 + w) \bmod 4$ |
| HARQ packet retransmission subframe | m | $p = (k + v) \bmod 4$ |

In Table 2, Parameter K may be determined according to Equation 1 or 2.

In Table 2, uplink feedback frame offset v and uplink feedback frame offset w in FDD transmission mode may be determined according to Equation 4.

$$v = \begin{cases} 0, & \text{if } ((D - l - 1 + m) \geq T_{proc}) \\ 1, & \text{else} \end{cases} \quad \text{(Equation 4)}$$

$$w = \begin{cases} 0, & \text{if } ((U - m - N_{TTI} + l) \geq T_{proc}) \\ 1, & \text{else} \end{cases}$$

In Equation 4, $N_{TTI}=1$ for one TTI transmission, and $N_{TTI}=U$ for Long TTI transmission.

Next, TDD HARQ timing according to Table 1 or Table 2 will be described with reference to FIGS. 5 to 9.

Figure 5:
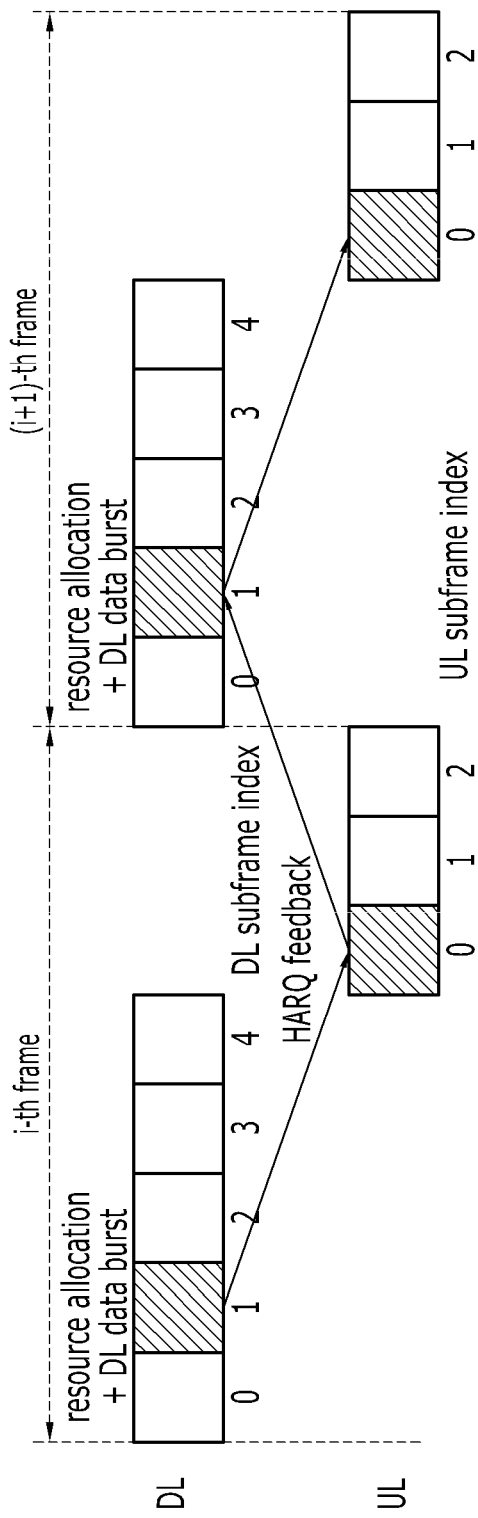
FIG. 5 shows TDD DL HARQ timing according to an exemplary embodiment of the present invention.

FIG. 5 shows TDD DL HARQ timing according to an exemplary embodiment of the present invention.

Particularly, FIG. 5 shows TDD DL HARQ timing according to Table 1 in one TTI transmission in which Tproc=3 and D:U=5:3. FIG. 5 is based on the adaptive asynchronous HARQ method, and the resource allocation and transmission format for HARQ retransmission may be different from the resource allocation and transmission format for initial transmission.

FIG. 5 shows an example in which the base station 100 transmits downlink resource allocation information and a downlink data burst to the mobile station 200 in a subframe corresponding to the downlink subframe index 1 of the i-th frame. In this case, the mobile station 200 decodes the received downlink data burst, and, transmits an ACK feedback as a positive response to the base station 100 if the decoding is successful, and transmits an NACK feedback as a negative response to the base station 100 if the decoding. The mobile station 200 uses a subframe corresponding to the uplink subframe index 0 of the i-th frame for feedback transmission. If the feedback is positive, the base station 100 transmits a new data burst and resource allocation information for the new data burst to the mobile station 200 in a subframe corresponding to the downlink subframe index 1 of an (i+1)-th frame. If the feedback is negative, the base station 100 retransmits the previously transmitted data burst and resource allocation information for the previously transmitted data burst to the mobile station 200 in a subframe corresponding to the downlink subframe index 1 of the (i+1)-th frame.

Figure 6:
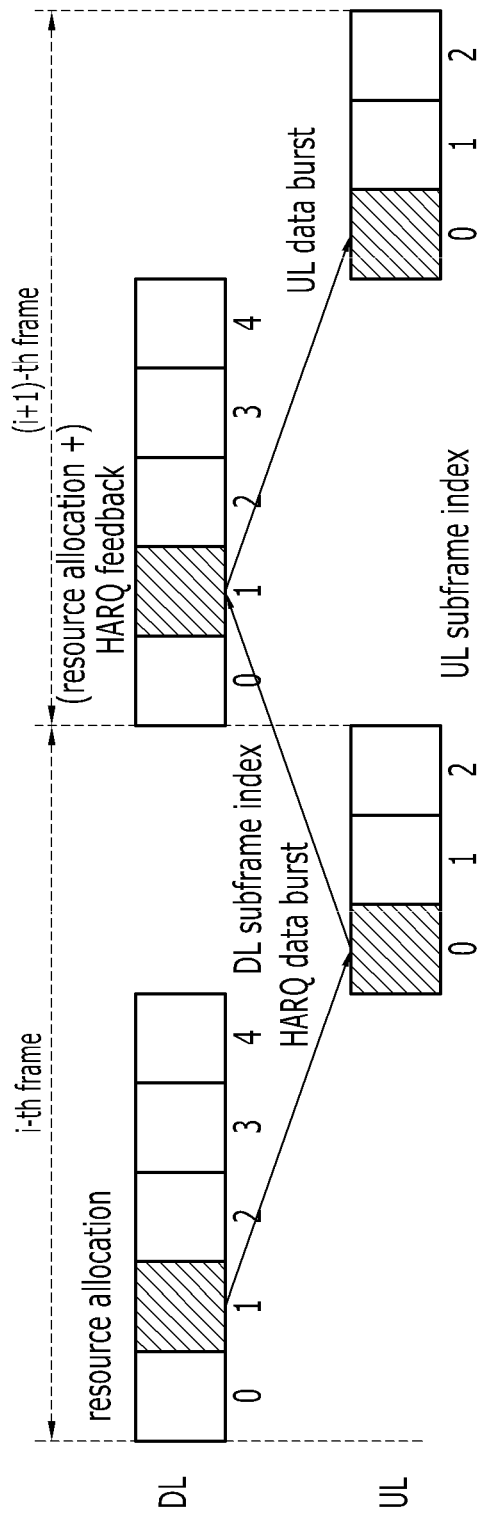
FIG. 6 shows TDD UL HARQ timing according to an exemplary embodiment of the present invention.

FIG. 6 shows TDD UL HARQ timing according to an exemplary embodiment of the present invention.

Particularly, FIG. 6 shows TDD UL HARQ timing according to Table 2 in one TTI transmission in which Tproc=3 and D:U=5:3. FIG. 6 is based on the synchronous HARQ method, and allocation is performed such that the resource location for HARQ retransmission is the same as the resource location for initial transmission.

FIG. 6 shows an example in which the base station 100 transmits uplink resource allocation information to the mobile station 200 in a subframe corresponding to the downlink subframe index 1 of the i-th frame. In this case, the mobile station 200 transmits an uplink data burst through an uplink resource allocated according to the uplink resource allocation information in a subframe corresponding to the uplink subframe index 0 of the i-th frame. The base station 100 transmits a feedback for the received uplink data burst to the mobile station 200 in a subframe corresponding to the downlink subframe index 1 of the (i+1)-th frame. At this point, if there exists a new uplink data burst to be transmitted, the base station 100 may transmit uplink resource allocation information, along with the feedback, to the mobile station 200. If the feedback is a negative response, the mobile station 200 retransmits the previously transmitted uplink data burst to a subframe corresponding to the uplink subframe index 0 of the (i+1)-th frame. If the feedback is a positive response, a new uplink data burst is transmitted in a subframe corresponding to the uplink subframe index 0 of the (1+)-th frame.

Figure 7:
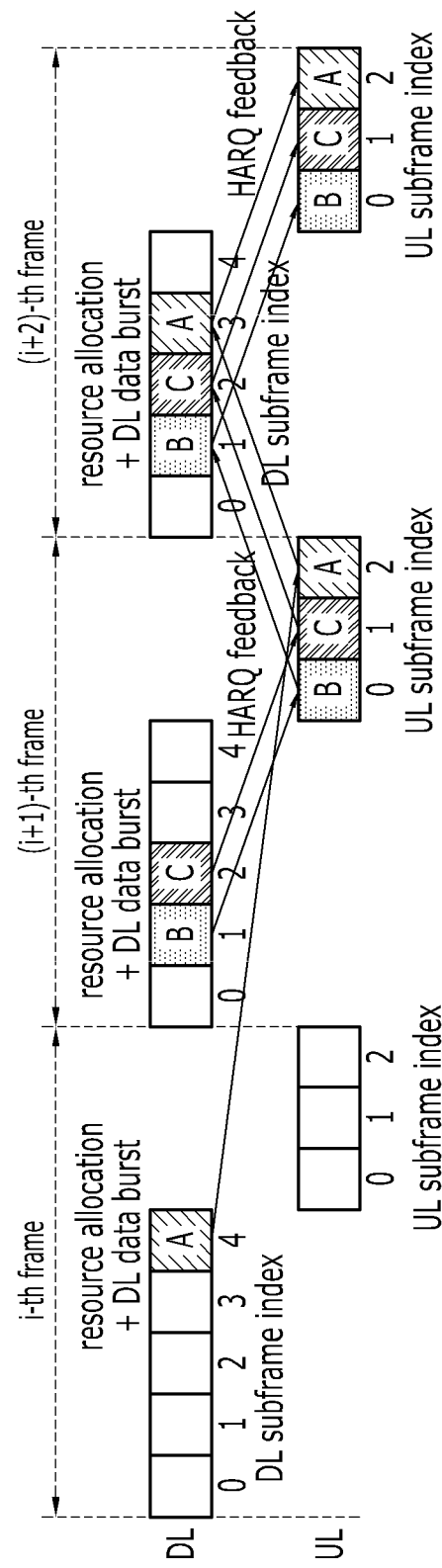
FIG. 7 shows TDD DL HARQ timing according to another exemplary embodiment of the present invention.

FIG. 7 shows TDD DL HARQ timing according to another exemplary embodiment of the present invention.

Particularly, FIG. 7 shows TDD DL HARQ timing according to Table 1 in one TTI transmission in which Tproc=3 and D:U=5:3. FIG. 7 is based on the adaptive asynchronous HARQ method, and the resource allocation and transmission format for HARQ retransmission may be different from the resource allocation and transmission format for initial transmission.

FIG. 7 shows an example in which the base station 100 transmits downlink data bursts for channels A, B, and C, respectively, to the mobile station 200 in a subframe corresponding to the downlink subframe index 4 of the i-th frame, a subframe corresponding to the downlink subframe index 1 of the (i+1)-th frame, and a subframe corresponding to the downlink subframe index 2 of the (i+1)-th frame. According to Table 1, the mobile station 200 transmits feedbacks for the downlink data bursts for channels A, B, and C, respectively, to the base station 100 in subframes corresponding to the uplink subframe indices 2, 0, and 1 of the (i+1)-th frame. Due to this, if the feedbacks are negative, the base station 100 retransmits the downlink data bursts for channels B, C, and A in subframes corresponding to the downlink subframe indices 1, 2, and 3 of an (i+2)-th frame. Like above, there may arise a problem that the HARQ procedure for channels B and C precedes the HARQ procedure for channel A.

Figure 8:
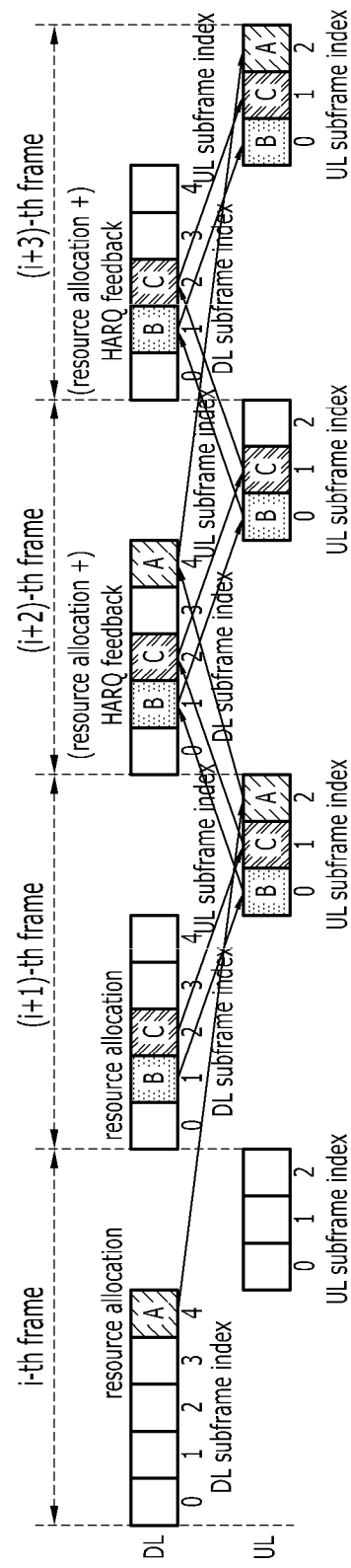
FIG. 8 shows TDD UL HARQ timing according to another exemplary embodiment of the present invention.

FIG. 8 shows TDD UL HARQ timing according to another exemplary embodiment of the present invention.

Particularly, FIG. 8 shows TDD UL HARQ timing according to Table 2 in one TTI transmission in which Tproc=3 and D:U=5:3. FIG. 8 is based on the synchronous HARQ method, and allocation is performed such that the resource location for HARQ retransmission is the same as the resource location for initial transmission.

FIG. 8 shows an example in which the base station 100 transmits uplink resource allocation information for channels A, B, and C to the mobile station 200 in a subframe corresponding to the downlink subframe index 4 of the i-th frame, a subframe corresponding to the downlink subframe index 1 of the (i+1)-th frame, and a subframe corresponding to the downlink subframe index 2 of the (i+1)-th frame. According to Table 2, the mobile station 200 transmits uplink data bursts for channels A, B, and C, respectively, to the base station 100 in subframes corresponding to the uplink subframe indices 0, 1, and 2 of the (i+1)-th frame. The base station 100 transmits feedbacks for the uplink data bursts for channels B, C, and A to the mobile station 200 in subframes corresponding to the downlink subframe indices 1, 2, and 4 of the (i+2)-th frame. If the feedbacks are negative responses, the mobile station 200 retransmits the downlink data bursts for channels B, C, and A in subframes corresponding to the uplink subframe indices 0 and 1 of the (i+2)-th frame and in a subframe corresponding to the uplink subframe index 2 of an (i+3)-th frame. Like above, there may arise a problem that the HARQ procedure for channel B and C precedes the HARQ procedure for channel A.

Figure 9:
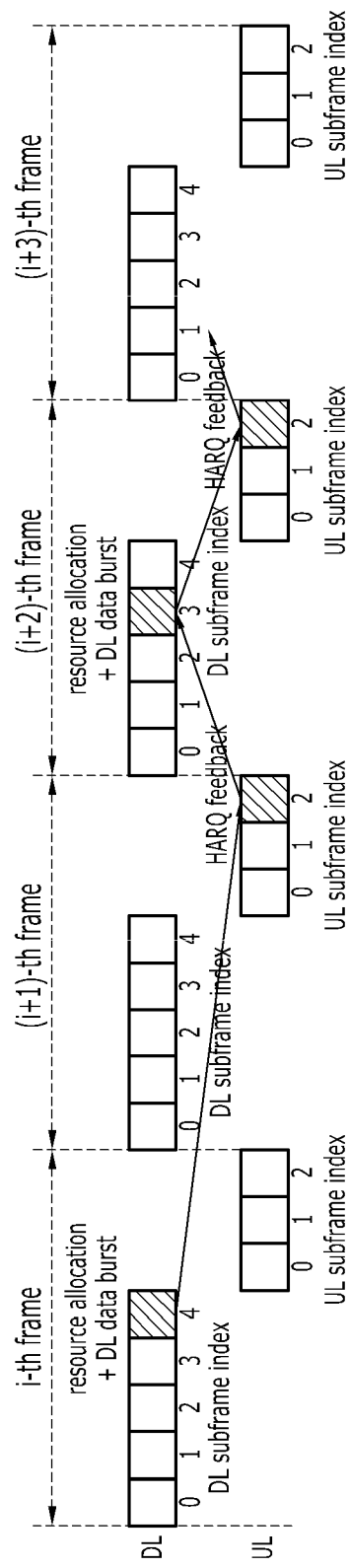
FIG. 9 shows TDD DL HARQ timing according to another exemplary embodiment of the present invention.

FIG. 9 shows TDD DL HARQ timing according to another exemplary embodiment of the present invention.

Particularly, FIG. 9 shows TDD DL HARQ timing according to Table 2 in one TTI transmission in which Tproc=3 and D:U=5:3. FIG. 9 is based on the adaptive asynchronous HARQ method, and the resource allocation and transmission format for HARQ retransmission may be different from the resource allocation and transmission format for initial transmission.

FIG. 9 shows an example in which the base station 100 transmits downlink resource allocation information and a downlink data burst to the mobile station 200 in a subframe corresponding to the downlink subframe index 4 of the i-th frame. According to Table 1, the mobile station 200 transmits a feedback for the downlink data burst to the base station 100 in a subframe corresponding to the uplink subframe index 2 of the (i+1)-th frame. If the feedback is positive, the base station 100 transmits a new data burst and resource allocation information for the new data burst to the mobile station 200 in a subframe corresponding to the downlink subframe index 3 of the (i+2)-th frame. If the feedback is negative, the base station 100 retransmits the previously transmitted data burst and the resource allocation information therefor to the mobile station 200 in a subframe corresponding to the downlink subframe index 3 of the (i+2)-th frame. If no resource is assigned for the position of an appropriate subframe of the (i+2)-th frame as in the downlink packet transmission shown in FIG. 9, only two HARQ packets are sent in four frames, and hence a packet delay may occur.

As the capability of the base station and the mobile station may vary with system implementation and the ratio of DL and UL frames may vary like 6:2 or 3:5, there is a need to consider a system whose data burst processing time and control signal processing time are different between uplink and downlink and variations in the ratio of DL and UL subframes. When taking into account a unit of TTI having 2 or 4 subframes, rather than 3 subframes, the HARQ transmission process becomes inefficient because the timing is out of sync, thus making it difficult to obtain good HARQ performance. Therefore, there is a need for an HARQ timing determination method to which various types of TTI transmission can be applied.

To this end, the HARQ timing determination method will be described with reference to Tables 3 and 4.

Table 3 shows TDD DL HARQ timing according to another exemplary embodiment of the present invention.

TABLE 3

| category | subframe (slot) index | frame index |
|---|---|---|
| DL resource allocation control signal transmission subframe | l | i |
| HARQ packet transmission subframe | For $N_{TTI}$ = one TTI   m = l<br>For $N_{TTI}$ = any TTI<br>m = l, for $0 \leq l < D - (N_{TTI} - 1)$<br>(spanned from l to $l + N_{TTI} - 1$)<br>For $N_{TTI}$ = all(long)TTI<br>m = 0 (spanned from 0 to D − 1) | i |
| HARQ feedback signal transmission subframe   $K' \leq 0$ | For $N_{TTI}$ = one TTI<br>$n = \begin{cases} 0, & \text{for } 0 \leq m < X \\ m - X, & \text{for } X \leq m < D \end{cases}$<br><br>for $N_{TTI}$ = any TTI<br>$n = \begin{cases} 0, & \text{for } 0 \leq m + (N_{TTI} - 1) < X \\ m + (N_{TTI} - 1) - X, & \text{for } X \leq m + (N_{TTI} - 1) < D \end{cases}$<br><br>For $N_{TTI}$ = all(long) TTI<br>n = (D − 1) − X | j = (i + z) mod (f) |

TABLE 3-continued

| category | subframe (slot) index | frame index |
|---|---|---|

K' > 0 For $N_{TTI}$ = one TTI $$n = \begin{cases} 0, & \text{for } 0 \leq m < X \\ m - X, & \text{for } X \leq m < D - K' \\ 0, & \text{for } D - K' \leq m < D \end{cases}$$

For $N_{TTI}$ = any TTI $$n = \begin{cases} 0, & \text{for } 0 \leq m + (N_{TTI} - 1) < X \\ m + (N_{TTI} - 1) - X, & \text{for } X \leq m + (N_{TTI} - 1) < D - K' \\ 0, & \text{for } D - K' \leq m + (N_{TTI} - 1) < D \end{cases}$$

For $N_{TTI}$ = all(long)TTI
n = 0

In Table 3, parameter K' for determining the resource allocation of HARQ packet and the position of an HARQ feedback signal is determined according to Equation 5.

$$K' = (T_{proc} + 1) - U \quad \text{(Equation 5)}$$

In Equation 5, 1 is added to the difference between Tproc and U so as to check whether a resource can be allocated following the index equal to the size of Tproc.

In the determination of K as shown in Equation 5, Tproc and the number of uplink subframes affect an HARQ packet for a data burst, a feedback signal, and the transmission time of a retransmission packet.

That is, if K' is a positive number, a value obtained by adding one subframe length to Tproc exceeds the number of subframes of one frame. Thus, this indicates that a procedure following the processing of the previous HARQ signal (HARQ packet transmission or HARQ feedback signal transmission) may not be performed in the current frame.

Therefore, if K' is a positive number, the processing of a HARQ signal that cannot be received in the current frame, i.e, the process of an HARQ signal after the D-K' subframe index is performed altogether in the next frame, with priority on the first subframe of the next frame. That is, if K' is a positive number, an HARQ signal (HARQ packet and HARQ feedback signal) that can be transmitted in the next frame with respect to D-K' is processed in the next frame earlier than a new allocated HARQ packet (data burst), thus preventing delay.

If K' is less than or equal to 0, the number U of subframes of one frame is greater than or equal to the value obtained by adding one subframe length to Tproc. Thus, this indicates that a procedure following the HARQ signal processing (HARQ packet transmission or HARQ feedback signal transmission) may be performed in all the UL subframes of the current frame. Particularly, if K'<0, this indicates that |K'| UL subframes useable for HARQ signal processing are present. That, K', which is less than or equal to 0, indicates that the processing of an HARQ signal (HARQ packet transmission or HARQ feedback signal transmission) subsequent to all the HARQ signals processed in the previous subframe can be performed altogether in the current frame.

In short, in DL and UL HARQ packet transmission, if K is a positive number, an HARQ signal subsequent to the previous HARQ signal is not processed in the current frame but in the next frame, whereas, if K' is less than or equal to 0, an HARQ signal subsequent to the previous HARQ signal is not processed in the next frame but in the current frame.

In what follows, the transmission of a DL HARQ packet in one TTI will be described according to Table 3.

A subframe index n for transmitting an HARQ feedback signal for an HARQ packet transmitted in an (m=1)-th subframe when K'≤0 is determined according to Equation 6.

$$n = \begin{cases} 0, & \text{for } 0 \leq m < X \\ m - X, & \text{for } X \leq m < D \end{cases} \quad \text{(Equation 6)}$$

X denotes the range of a DL subframe index m for an HARQ packet in which an HARQ feedback signal for the HArQ packet can be transmitted in the first UL subframe of the current frame, which is calculated according to Equation 7.

$$X = (D - U) - K' = D - (T_{proc} + 1) \quad \text{(Equation 7)}$$

According to Equation 6 and Equation 7, the number of downlink subframes and the value of Tproc affect the resource allocation locations and ranges of data and control signals desired to be transmitted.

A subframe index for transmitting an HARQ feedback signal for an HARQ packet when K' is a positive number is determined as follows.

If K' is a positive number, the processing of an HARQ signal that cannot be received in the current frame, i.e., the process of an HARQ signal after the D-K' subframe index is performed altogether in the next frame, with priority on the first subframe of the next frame. That is, if K' is a positive number, an HARQ signal (HARQ packet and HARQ feedback signal) that can be transmitted in the next frame with respect to D-K' is processed in the next frame earlier than a new allocated HARQ packet (data burst), thus preventing delay.

To this end, a subframe index n for transmitting an HARQ feedback signal for an HARQ packet transmitted in an (m=1)-th subframe when K'>0 is determined according to Equation 8.

$$n = \begin{cases} 0, & \text{for } 0 \leq m < X \\ m - X, & \text{for } X \leq m < D - K' \\ 0, & \text{for } D - K' \leq m < D \end{cases} \quad \text{(Equation 8)}$$

As shown in Equation 8, for 0≤m<X, an HARQ feedback is allocated to the first subframe of the current frame. For X≤m<D-K', an HARQ feedback is allocated to a subframe corresponding to the UL subframe index (m-x) of the current frame. For D-K'≤m<D, an HARQ feedback is allocated to the first subframe of the next frame and processed earlier than a feedback signal for a new allocated HARQ packet.

To this end, the index j of a frame in which an HARQ feedback is transmitted is determined by (i+z)mod(f). f indicates a limited range of a frame in which a feedback signal can be transmitted, and i indicates the index of the current frame. For K'≥0, frame offset z is determined according to Equation 9.

$$z = \begin{cases} 0, & \text{if } 0 \leq m < D - K' \\ 1, & \text{else} \end{cases} \quad \text{(Equation 9)}$$

In the transmission of an HARQ packet in Long TTI, m indicates a subframe index which is a timing on which the transmission of the last part of the HARQ packet is completed. For example, if an HARQ packet is transmitted, occupying all downlink subframes, m is the last subframe index D−1.

The synchronous HARQ scheme is achieved by determining the resource allocation location for the retransmission of a DL HARQ packet to be identical to the resource allocation location for the previously transmitted HARQ packet. The asynchronous HARQ scheme is achieved by changing the resource allocation location for a retransmission packet in order to obtain a scheduling gain more effectively when the base station allocates resources.

Table 4 shows TDD UL HARQ timing according to another exemplary embodiment of the present invention.

TABLE 4

| category | | | | subframe (slot) index | frame index |
|---|---|---|---|---|---|
| UL resource allocation control signal transmission subframe | | | | l | i |
| HARQ packet transmission subframe | For $N_{TTI}$ = one TTI | D > U | K' ≤ 0 | $m = \begin{cases} 0, & \text{for } 0 \leq l < X \\ l - X, & \text{for } X \leq l < D \end{cases}$ | $j = (i + v_d) \bmod(f)$ |
| | | | K' > 0 | $m = \begin{cases} 0, & \text{for } 0 \leq l < X \\ l - X, & \text{for } X \leq l < D - K' \\ 0, \ldots, \text{or } l - X, & \text{for } D - K' \leq l < D \end{cases}$ | |
| | | D ≤ U | K' ≤ 0 | For X ≥ 0, $m = \begin{cases} 0, & \text{for } 0 \leq l < X \\ l - X, & \text{for } X \leq l < D - 1 \\ l - X, \ldots, \text{or } U - 1, & \text{for } D - 1 \leq l < D \end{cases}$ | $j = (i + v_u) \bmod(f)$ |
| | | | | For X < 0, $m = \begin{cases} l - X, \ldots, \text{or } U - 1, & \text{for } 0 \leq l < D - |K'| \\ 0, \ldots, \text{or } |X| - 1, & \text{for } D - |K'| \leq l < D \end{cases}$ | |
| | | | K' > 0 | For X < 0, $m = \begin{cases} l - X, & \text{if } 0 \leq l < D - |K'| \\ 0, \ldots, \text{or} |X| - 1, & \text{for } D - |K'| \leq l < D \end{cases}$ | |
| | For $N_{TTI}$ = all(Long) TTI | | | m = 0 (spanned from 0 to U − 1) | $j = (i + v_{long}) \bmod(f)$ |
| HARQ feedback signal transmission subframe | For $N_{TTI}$ = one TTI | | K' ≤ 0 | n = l | $k = (j + 1 + w) \bmod(f)$ |
| | | | K' > 0 | $n = \begin{cases} m + K', & \text{if } m < D - K' \\ l, & \text{else} \end{cases}$ | |
| | For $N_{TTI}$ = all(Long) TTI | | | $n = \begin{cases} (U - 1) + K', & \text{if } X \geq 0 \\ l, & \text{else} \end{cases}$ | |
| HARQ packet retransmission subframe | | | | m | $p = (k + v_r) \bmod(f)$ |

First, the transmission of an UL HARQ packet in one TTI will be described according to Table 4.

In Table 4, K' is determined according to Equation 5

As shown in Table 4, the position of a subframe index m for UL HARQ packet transmission, the position of a subframe index n for HARQ feedback signal transmission, and the position of a subframe index m for HARQ packet retransmission are determined differently for K'≤0 and K'>0.

As explained above, for K'≤0, the number U of uplink subframes of one frame is greater than or equal to a value obtained by adding one subframe length to Tproc. Thus, HARQ signal processing (HARQ packet transmission and HARQ feedback signal transmission) can be performed in all uplink subframes of the current frame.

Unlike DL packet transmission scheme, UL packet transmission is affected by the ratio of downlink subframes and uplink subframes. Particularly, if U is greater than D, the limitation on the subframe position for UL packet transmission becomes smaller. Therefore, the base station can allocate resources to a proper UL area.

First of all, a method of determining a subframe position for UL HARQ packet transmission when D>U will be discussed below. If the frame ratio is D≥U and K'≤0, the subframe index m for UL HARQ packet transmission is determined as follows.

$$m = \begin{cases} 0, & \text{for } 0 \le l < X \\ l - X, & \text{for } X \le l < D \end{cases} \quad \text{(Equation 10)}$$

In Equation 10, X is determined according to Equation 7.

As shown in Equation 10, for 0≤I<X, an uplink subframe index m for UL HARQ packet transmission is 0. For X≤I<D, the uplink subframe index m for UL HARQ packet transmission is I-X.

If the frame ratio is D>U and K'>0, the subframe index m for UL HARQ packet transmission is determined as follows.

$$m = \begin{cases} 0, & \text{for } 0 \le l < X \\ l - X, & \text{for } X \le l < D - K' \\ 0, \ldots, l - X & \text{for } D - K' \le l < D \end{cases} \quad \text{(Equation 11)}$$

As shown in Equation 11, for 0≤I<X, a UL HARQ packet is allocated to a subframe corresponding to the uplink subframe index 0 of the current frame. For X≤I<D-K', the UL HARQ packet is allocated to a subframe corresponding to the uplink subframe index I-X of the current frame. For D-K'≤I<D, the UL HARQ packet is allocated to a subframe corresponding to one of the uplink subframe indices 0 to I-X of the next frame and processed earlier than a feedback signal for a new allocated HARQ packet.

The frame index j for the UL HARQ packet is determined by (i+v_d)mod(f), f indicates a limited range of a frame in which a HARQ packet can be transmitted, and i indicates the index of the current frame. $v_d$ is represented by 0 and 1 to indicate whether to allocate an UL HARQ packet to the next frame. If the frame ratio is D>U, $v_d$ is determined according to Equation 12.

$$\text{If } K' \le 0 \quad \text{(Equation 12)}$$

$$v_d = 0$$

else $$v_d = \begin{cases} 0, & \text{if } l < D - K' \\ 1, & \text{else} \end{cases}$$

A method of determining a subframe position for UL HARQ packet transmission when D≤U will be discussed below.

If the frame ratio is D≥U and K'≤0, the subframe index m for UL HARQ packet transmission is determined differently for X≥0 and X<0 as shown in Equation 13 and Equation 14.

$$\text{For } X \ge 0, \quad \text{(Equation 13)}$$

$$m = \begin{cases} 0, & \text{for } 0 \le l < X \\ l - X, & \text{for } X \le l < D - 1 \\ l - X, \ldots, \text{or } U - 1, & \text{for } D - 1 \le l < D \end{cases}$$

$$\text{For } X < 0, \quad \text{(Equation 14)}$$

$$m = \begin{cases} 0, \ldots, l - X & \text{for } 0 \le l < X \\ l - X, & \text{for } X \le l < D \end{cases}$$

If the frame ratio is D≤U and K'>0, only the case of X<0 is represented arithmetically. The subframe index m for UL HARQ packet transmission is determined as follows.

$$m = \begin{cases} l - X, & \text{for } 0 \le l < D - |K'| \\ 0, \ldots, \text{or } |X| - 1, & \text{for } D - |K'| \le l < D \end{cases} \quad \text{(Equation 15)}$$

For D≤U, the position j of the frame for UL HARQ packet transmission is determined by (i+v_u)mod(f), and $v_u$ is determined according to Equation 16.

$$\text{If } X \ge 0 \quad \text{(Equation 16)}$$

$$v_u = 0$$

else $$v_u = \begin{cases} 0, & \text{if } l < D - |K'| \\ 1, & \text{else} \end{cases}$$

Hereinafter, the transmission of a UL HARQ feedback signal according to Table 4 will be discussed.

In the transmission of the UL HARQ feedback signal, unlike the transmission of the UL HARQ packet, the position of the subframe index n for DL HARQ feedback signal transmission is determined differently depending on whether the calculated K' has a value of 0 or a negative number or a value of a positive number. The subframe index n for DL HARQ feedback signal transmission is determined according to Equation 17.

$$\text{If } K' > 0 \quad \text{(Equation 17)}$$

$$n = \begin{cases} m + K', & \text{if } m < D - K' \\ l, & \text{else} \end{cases}$$

else $$n = l$$

For K'≤0, the number U of uplink subframes of one frame is greater than or equal to the value obtained by adding one subframe length to Tproc. Thus, HARQ feedback signal can be transmitted in all the uplink subframes of the current frame. That is, the corresponding HARQ feedback signal can be transmitted at the same position as the subframe position of the previously transmitted DL frame in which a UL resource allocation control signal has been transmitted. That is, n=l.

When K'>0 and the HARQ feedback signal is the first feedback signal for the UL HARQ packet, if m≥D−K', n=1, or else an index, obtained by adding K' to the subframe index m of the initial UL HARQ packet that has been previously transmitted, corresponds to the transmission position of the HARQ feedback signal for the HARQ packet.

The position k of a frame for HARQ feedback signal transmission is determined by (i+1+w)mod(f), f indicates a limited range of a frame in which an HARQ feedback can be transmitted, and i indicates the index of the current frame. w is represented by 0 and 1 to indicate whether to allocate an HARQ feedback signal to the next frame, and is determined according to Equation 18.

$$w = \begin{cases} 0, & \text{if } m < D - K' \\ 1, & \text{else} \end{cases} \quad \text{(Equation 18)}$$

According to Table 4, the position of a subframe for UL HARQ packet retransmission is identical to the position m of a subframe for the initial UL HARQ packet that has been previously transmitted. Moreover, the position k of the frame for UL HARQ packet retransmission is expressed by $(k+v_r)$ mod(f), f indicates a limited range of a frame in which the UL HARQ packet can be retransmitted, and i indicates the index of the current frame. $v_r$ is represented by 0 and 1 to indicate whether to allocate the retransmission UL HARQ packet to the next frame, and is determined according to Equation 19.

$$v_r = \begin{cases} 0, & \text{if } n < D - K' \\ 1, & \text{else} \end{cases} \quad \text{(Equation 19)}$$

The TDD DL and UL HARQ timings for $N_{TTI}$=any TTI, i.e., when a data burst is transmitted in a subframe of a given TTI value and for $N_{TTI}$=long TTI when a data burst is transmitted in all subframes are similar to those for one TTI. At this point, the HARQ timing is shown in Table 3 and Table 4.

Frame offset z is determined according to Equation 20 and Equation 21.

For $N_{TTI}$ = any TTI length (Equation 20)
If $K' \leq 0$
z = 0
else
$$z = \begin{cases} 0, & \text{if } m + (N_{TTI} - 1) < D - K' \\ 1, & \text{else} \end{cases}$$

For $N_{TTI}$ = Long TTI (all TTI) length (Equation 21)
If $K' \leq 0$
z = 0
else
z = 1

In the calculation method of a UL HARQ timing, for $N_{TTI}$=long TTI, frame offset $v_{long}$ is determined by the following Equation 22.

$$v_{long} = \begin{cases} 0, & \text{if } l \leq X \\ 1, & \text{else} \end{cases} \quad \text{(Equation 22)}$$

Next, TDD HARQ timing according to Table 3 and Table 4 will be described with reference to FIGS. 10 and 11.

Figure 10:
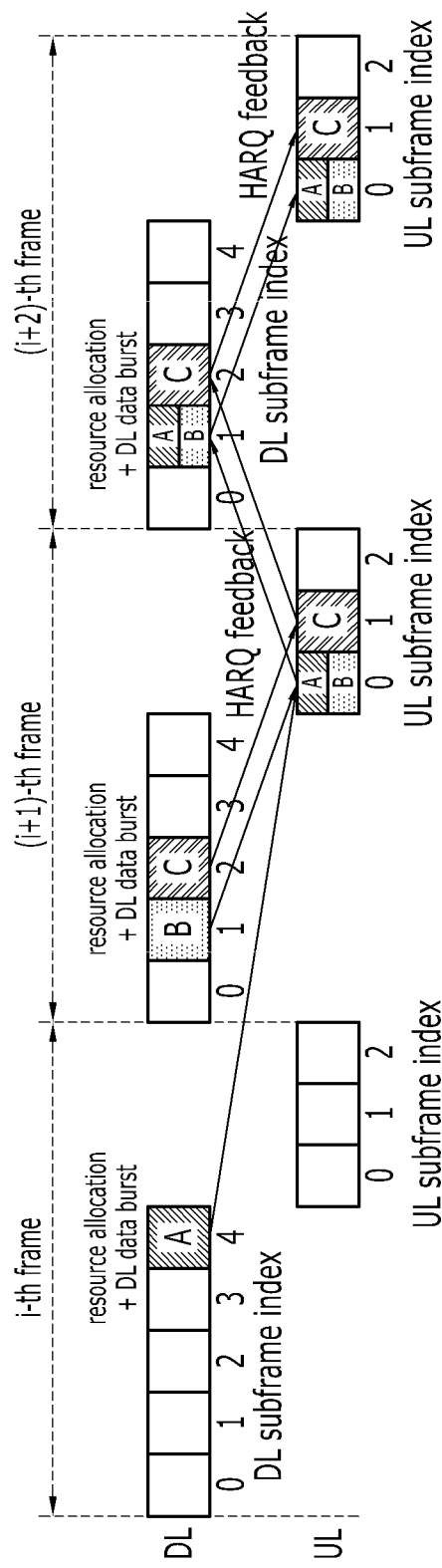
FIG. 10 shows TDD DL HARQ timing according to another exemplary embodiment of the present invention.

FIG. 10 shows TDD DL HARQ timing according to another exemplary embodiment of the present invention.

Particularly, FIG. 10 shows TDD DL HARQ timing according to Table 3 in one TTI transmission in which Tproc=3 and D:U=5:3. FIG. 10 is based on the adaptive asynchronous HARQ method, and the resource allocation and transmission format for HARQ retransmission may be different from the resource allocation and transmission format for initial transmission.

FIG. 10 shows an example in which the base station 100 transmits downlink data bursts for channels A, B, and C, respectively, to the mobile station 200 in a subframe corresponding to the downlink subframe index 4 of the i-th frame, a subframe corresponding to the downlink subframe index 1 of the (i+1)-th frame, and a subframe corresponding to the downlink subframe index 2 of the (i+1)-th frame. According to Table 3, the mobile station 200 transmits feedbacks for the downlink data bursts for channels A, B, and C, respectively, to the base station 100 in subframes corresponding to the uplink subframe indices 0, 0, and 1 of the (i+1)-th frame. Due to this, if the feedbacks are negative, the base station 100 retransmits the downlink data bursts for channels B, C, and A in subframes corresponding to the downlink subframe indices 1, 1, and 2 of an (i+2)-th frame. Like above, in accordance with the HARQ timing of Table 3, the HARQ procedures for channels A, B, and C are sequential and prevent packet transmission delay.

Figure 11:
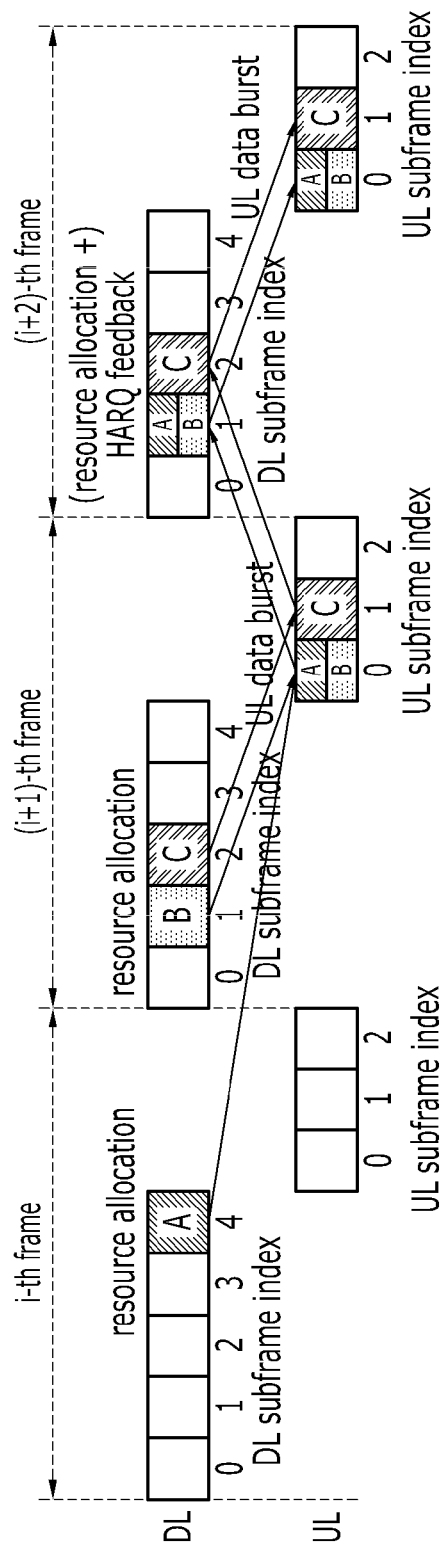
FIG. 11 shows TDD UL HARQ timing according to another exemplary embodiment of the present invention.

FIG. 11 shows TDD UL HARQ timing according to another exemplary embodiment.

Particularly, FIG. 11 shows TDD DL HARQ timing according to Table 4 in one TTI transmission in which Tproc=3 and D:U=5:3. FIG. 11 is based on the synchronous HARQ method, and allocation is performed such that the resource location for HARQ retransmission is the same as the resource location for initial transmission.

FIG. 11 shows an example in which the base station 100 transmits uplink resource allocation information for channels A, B, and C to the mobile station 200 in a subframe corresponding to the downlink subframe index 4 of the i-th frame, a subframe corresponding to the downlink subframe index 1 of the (i+1)-th frame, and a subframe corresponding to the downlink subframe index 2 of the (i+1)-th frame. According to Table 4, the mobile station 200 transmits uplink data bursts for channels A, B, and C, respectively, to the base station 100 in subframes corresponding to the uplink subframe indices 0, 0, and 1 of the (i+1)-th frame. The base station 100 transmits feedbacks for the uplink data bursts for channels A, B, and C to the mobile station 200 in subframes corresponding to the downlink subframe indices 1, 1, and 2 of the (i+2)-th frame. If the feedbacks are negative responses, the mobile station 200 retransmits the uplink data bursts for channels A, B, and C in subframes corresponding to the uplink subframe indices 0, 0, and 1 of the (i+2)-th frame. Like above, in accordance with the HARQ timing of Table 4, the HARQ procedures for channels A, B, and C are sequential and prevent packet transmission delay.

The exemplary embodiments of the present invention are not implemented only by a device and/or method, but can be implemented through a program for realizing functions corresponding to the configuration of the exemplary embodiments of the present invention and a recording medium having the program recorded thereon. These implementations can be realized by the ordinarily skilled person in the art from the description of the above-described exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS base station 100, mobile station 200

What is claimed is:

1. A method for a mobile station to communicate with a base station using a frame comprising one or more downlink subframes and one or more uplink subframes, the method comprising:
   receiving a data burst from the base station in a frame corresponding to a first frame index;
   determining a first parameter value using a difference between a radio signal processing time and a transmission time of the one or more uplink subframes;
   determining a frame offset using the first parameter value; and
   transmitting a feedback for the data burst to the base station in a frame corresponding to a second frame index determined by the first frame index and the frame offset.

2. The method of claim 1, wherein the determining of the frame offset comprises determining the frame offset based on a difference between the number of the one or more downlink subframes and the first parameter value.

3. The method of claim 2, wherein the receiving of the data burst comprises receiving the data burst in a subframe corresponding to a downlink subframe index of the frame corresponding to the first frame index, and
   the transmitting of the feedback comprises:
   determining an uplink subframe index using the downlink subframe index and the first parameter value; and
   transmitting the feedback in a subframe corresponding to the uplink subframe index of a frame corresponding to the second frame index.

4. A method for a mobile station to communicate with a base station using a frame comprising one or more downlink subframes and one or more uplink subframes, the method comprising:
   receiving a data burst from the base station in a frame corresponding to a first frame index;
   determining a first parameter value using a difference between a radio signal processing time and a communication time of the one or more uplink subframes;
   determining a frame offset using the first parameter value; and
   transmitting a feedback for the data burst to the base station in a frame corresponding to a second frame index determined by the first frame index and the frame offset,
   wherein the determining of the frame offset comprises determining the frame offset based on a difference between the number of the one or more downlink subframes and the first parameter value,
   wherein the receiving of the data burst comprises receiving the data burst in a subframe corresponding to a downlink subframe index of the frame corresponding to the first frame index, and
   the transmitting of the feedback comprises:
   determining an uplink subframe index using the downlink subframe index and the first parameter value; and
   transmitting the feedback in a subframe corresponding to the uplink subframe index of a frame corresponding to the second frame index,
   wherein the determining of the uplink subframe index comprises determining the uplink subframe index as 0 if the downlink subframe index is greater than or equal to a value obtained by subtracting the first parameter value from the number of the one or more downlink subframes.

5. The method of claim 3, wherein the determining of the uplink subframe index comprises:
   determining a second parameter value using a difference between the number of the one or more downlink subframes and the radio signal processing; and
   determining the uplink subframe index using the downlink subframe index, the first parameter value, the second parameter value, and the number of subframes occupied by the data burst.

6. A method for a mobile station to communicate with a base station using a frame comprising one or more downlink subframes and one or more uplink subframes, the method comprising:
   receiving a data burst from the base station in a frame corresponding to a first frame index;
   determining a first parameter value using a difference between a radio signal processing time and a communication time of the one or more uplink subframes;
   determining a frame offset using the first parameter value; and
   transmitting a feedback for the data burst to the base station in a frame corresponding to a second frame index determined by the first frame index and the frame offset,
   wherein the determining of the frame offset comprises determining the frame offset based on a difference between the number of the one or more downlink subframes and the first parameter value,
   wherein the receiving of the data burst comprises receiving the data burst in a subframe corresponding to a downlink subframe index of the frame corresponding to the first frame index, and
   the transmitting of the feedback comprises:
   determining an uplink subframe index using the downlink subframe index and the first parameter value; and
   transmitting the feedback in a subframe corresponding to the uplink subframe index of a frame corresponding to the second frame index,
   wherein the determining of the uplink subframe index comprises:
   determining a second parameter value using a difference between the number of the one or more downlink subframes and the radio signal processing; and
   determining the uplink subframe index using the downlink subframe index, the first parameter value, the second parameter value, and the number of subframes occupied by the data burst,
   wherein, if the first parameter value is less than or equal to 0, the uplink subframe index is determined by the following Equation:

$$n = \begin{cases} 0, & \text{for } 0 \le m + (N_{TTI} - 1) < X \\ m + (N_{TTI} - 1) - X, & \text{for } X \le m + (N_{TTI} - 1) < D \end{cases}$$

where n is the uplink subframe index, m is the downlink subframe index, $N_{TTI}$ is the number of subframes occupied by the data burst, X is the second parameter value, and D is the number of the one or more downlink subframes.

7. The method of claim 6, wherein, if the first parameter value is greater than 0, the uplink subframe index is determined by the following Equation:

$$n = \begin{cases} 0, & \text{for } 0 \le m + (N_{TTI} - 1) < X \\ m + (N_{TTI} - 1) - X, & \text{for } X \le m + (N_{TTI} - 1) < D - K' \\ 0, & \text{for } D - K' \le m + (N_{TTI} - 1) < D \end{cases}$$

where K' is the first parameter value.

8. A method for a base station to communicate with a mobile station using a frame comprising one or more downlink subframes and one or more uplink subframes, the method comprising:
transmitting a data burst to the mobile station in a frame corresponding to a first frame index; and
receiving a feedback for the data burst from the mobile station in a frame corresponding to a second frame index,
wherein the second frame index is determined by the first frame index and a frame offset, and
the frame offset is determined by a parameter value determined by a difference between a radio signal processing time and a transmission time of the one or more uplink subframes.

9. The method of claim 8, wherein the frame offset is determined based on a difference between the number of the one or more downlink subframes and the parameter value.

10. A method for a base station to communicate with a mobile station using a frame comprising one or more downlink subframes and one or more uplink subframes, the method comprising:
transmitting a data burst to the mobile station in a frame corresponding to a first frame index; and
receiving a feedback for the data burst from the mobile station in a frame corresponding to a second frame index,
wherein the second frame index is determined by the first frame index and a frame offset, and
the frame offset is determined by a parameter value determined by a difference between a radio signal processing time and a communication time of the one or more uplink subframes,
wherein the frame offset is determined based on a difference between the number of the one or more downlink subframes and the parameter value,
wherein the data burst is transmitted in a subframe corresponding to a downlink subframe index, the feedback is received in a subframe corresponding to an uplink subframe index, and, if the downlink subframe index is greater than or equal to a value obtained by subtracting the parameter value from the number of the one or more downlink subframes, the uplink subframe index is determined as 0.

11. A method for a mobile station to communicate with a base station using a frame comprising one or more downlink subframes and one or more uplink subframes, the method comprising:
receiving resource allocation information from the base station in a frame corresponding to a first frame index;
determining a first parameter value using a difference between a radio signal processing time and a transmission time of the one or more uplink subframes;
determining a first frame offset by the first parameter value; and
transmitting a data burst to the base station in a frame corresponding to a second frame index determined by the first frame index and the frame offset.

12. The method of claim 11, further comprising receiving a feedback for the data burst in a frame corresponding to a third frame index,
wherein the third frame index is determined by the second frame index and a second frame offset, and
the second frame offset is determined by the first parameter value.

13. The method of claim 12, comprising:
if the feedback is negative, determining a third frame offset by the first parameter value; and
retransmitting the data burst to the base station in a frame corresponding to a fourth frame index determined by the third frame index and the third frame offset.

14. The method of claim 13, wherein the second frame offset is determined by comparing a difference between the number of the one or more downlink subframes and the first parameter value with the second frame index, and the third frame offset is determined by comparing the difference between the number of the one or more downlink subframes and the first parameter value with the second frame index.

15. The method of claim 13, wherein the resource allocation information is received in a frame corresponding to a first downlink subframe index, the data burst is transmitted in a subframe corresponding to a first uplink subframe index, and the first uplink subframe index is determined by the first parameter value.

16. The method of claim 15, wherein the first uplink subframe index is determined by the number of subframes occupied by the data burst, the comparison between the number of the one or more downlink subframes and the one or more uplink subframes, the first parameter value, and a second parameter value determined by a difference between the number of the one or more downlink subframes and the radio signal processing time.

17. A method for a mobile station to communicate with a base station using a frame comprising one or more downlink subframes and one or more uplink subframes, the method comprising:
receiving resource allocation information from the base station in a frame corresponding to a first frame index;
determining a first parameter value using a difference between a radio signal processing time and a communication time of the one or more uplink subframes;
determining a first frame offset by the first parameter value; and
transmitting a data burst to the base station in a frame corresponding to a second frame index determined by the first frame index and the frame offset, comprising:
if the feedback is negative, determining a third frame offset by the first parameter value; and
retransmitting the data burst to the base station in a frame corresponding to a fourth frame index determined by the third frame index and the third frame offset,
wherein the resource allocation information is received in a frame corresponding to a first downlink subframe index, the data burst is transmitted in a subframe corresponding to a first uplink subframe index, and the first uplink subframe index is determined by the first parameter value,
wherein the first uplink subframe index is determined by the number of subframes occupied by the data burst, the comparison between the number of the one or more downlink subframes and the one or more uplink subframes, the first parameter value, and a second parameter value determined by a difference between the number of the one or more downlink subframes and the radio signal processing time, wherein the feedback is received in a subframe corresponding to a second downlink subframe index, the data burst is retransmitted in a subframe corresponding to a second uplink subframe index, and the second downlink subframe index is determined by the number of subframes occupied by the data burst and the first parameter value, wherein the second uplink subframe index is the same as the first uplink subframe index.

18. A method for a base station to communicate with a mobile station using a frame comprising one or more downlink subframes and one or more uplink subframes, the method comprising:

transmitting resource allocation information to the mobile station in a frame corresponding to a first frame index; and receiving a data burst from the mobile station in a frame corresponding to a second frame, wherein the second frame index is determined by the first frame index and a frame offset, and the frame offset is determined by a parameter value determined by a difference between a radio signal processing time and a transmission time of the one or more uplink subframes.

19. The method of claim 18, further comprising:

transmitting a feedback for the data burst in a frame corresponding to a third frame index; and retransmitting the data burst to the base station in a frame corresponding to a fourth frame index, wherein the third frame index is determined by the first parameter value, and the fourth frame index is determined by the first parameter value.

20. The method of claim 19, wherein the resource allocation information is transmitted in a subframe corresponding to a first downlink subframe index, the data burst is received in a subframe corresponding to a first uplink subframe index, and the first uplink subframe index is determined by the first downlink subframe index and the first parameter value.

* * * * *